(12) United States Patent
Oshima et al.

(10) Patent No.: US 6,800,967 B2
(45) Date of Patent: Oct. 5, 2004

(54) INTEGRATED MAGNET BODY AND MOTOR INCORPORATING IT

(75) Inventors: Kazuhide Oshima, Osaka (JP); Kohshi Yoshimura, Osaka (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/296,251

(22) PCT Filed: Jun. 7, 2001

(86) PCT No.: PCT/JP01/04799

§ 371 (c)(1),
(2), (4) Date: Dec. 9, 2002

(87) PCT Pub. No.: WO01/95460

PCT Pub. Date: Dec. 13, 2001

(65) Prior Publication Data

US 2004/0046469 A1 Mar. 11, 2004

(30) Foreign Application Priority Data

Jun. 9, 2000 (JP) ..................... 2000-174536

(51) Int. Cl.[7] .............................................. H02K 41/00
(52) U.S. Cl. ........................... 310/12; 310/13; 335/306
(58) Field of Search ...................... 310/156.21, 156.45, 310/156.82, 154.07, 154.11, 12–14; 361/147, 148; 335/209, 153, 296, 297, 302, 306

(56) References Cited

U.S. PATENT DOCUMENTS 5,317,297 A * 5/1994 Kaufman et al. ........... 335/297
5,448,123 A * 9/1995 Nilson et al. ............... 310/261
6,570,273 B2 * 5/2003 Hazelton .................... 310/12
6,661,145 B1 * 12/2003 Nilson ................... 310/156.01

FOREIGN PATENT DOCUMENTS

| JP | 60-63903 | 4/1985 |
| JP | 63-18950 | 1/1988 |
| JP | 2-4097 | 1/1990 |
| JP | 4-79741 | 2/1992 |
| JP | 9-7867 | 1/1997 |
| JP | 11-4555 | 1/1999 |

* cited by examiner

Primary Examiner—Dang Le
(74) Attorney, Agent, or Firm—Armstrong, Kratz, Quintos, Hanson & Brooks

(57) ABSTRACT

The integrated magnet body according to the invention is an integrated magnet body formed by laminating and securing a plurality of pieces of magnet through an insulating film between pieces of magnet, characterized in that the insulating film has a film thickness of 0.01 $\mu$m or more, and a ratio of a total sum of the thickness of the insulating films to an overall length in the laminating direction of the integrated magnet body is in a range of from 0.0005 to 3%. The integrated magnet body according to the invention is excellent in insulating property and effective volume ratio and thus can attain high efficiency of a motor by installing the integrated magnet body in the motor.

9 Claims, 3 Drawing Sheets

INTEGRATED MAGNET BODY AND MOTOR INCORPORATING IT

TECHNICAL FIELD

The present invention relates to an integrated magnet body used in a motor for an electric vehicle and a motor for a home electric appliance, and a motor incorporating the same. More specifically, it relates to an integrated magnet body excellent in insulating property and effective volume ratio, and a high efficiency motor incorporating the same.

BACKGROUND ART

As a motor for an electric vehicle (such as EV: electric vehicle and HEV: hybrid electric vehicle) and a motor for a home electric appliance, for example, brushless motors, such as so-called IPM (interior permanent magnet motor) and SPM (surface permanent magnet motor), have been developed, which uses a rare earth metal-based permanent magnet represented by an R—Fe—B based permanent magnet embedded in a rotor formed with silicon steel plates or the like.

In recent years, improvements in materials for rare earth metal-based permanent magnet proceed, and performances of motors are also improved according thereto. However, because the rare earth metal-based permanent magnet has electroconductivity, it has problems where such disadvantages are caused upon application of an alternating current magnetic field on the magnet, in that an eddy current is generated in the magnet to lower the efficiency of the motor as an eddy current loss, the characteristics of the motor are deteriorated by heat demagnetization of the magnet.

As a method for lowering the eddy current occurring in the magnet, there is such a method in that the magnet is divided, and plural magnet pieces are laminated with electric insulation therebetween to form an integrated magnet body (see, for example, JP-A-4-79741). Conventionally, upon employing the method, for example, an adhesive having insulating property is coated on the magnet pieces, and one of the magnet pieces is adhered and fixed with another.

However, in the method where an adhesive having insulating property is coated on the surface of the magnet pieces, followed by adhering and fixing, it is necessary that the film thickness of the adhesive formed between the magnetic piece and another magnetic piece is as thick as 100 $\mu$m or more to assure the prescribed adhesion strength. Therefore, in an integrated magnet body having the prescribed dimension, even when sufficient insulating property can be obtained among the respective magnet pieces, the volume ratio of the magnet pieces themselves constituting the integrated magnet body (hereinafter referred to as an effective volume ratio) is lowered corresponding to the thickness of the adhesive. As a result, the effective magnetic flux density is lowered to cause deterioration of the characteristics of the motor, which brings about deterioration of the efficiency of the motor. Furthermore, in this method, the thickness of the adhesive influences the dimensional accuracy, and thus an integrated magnet body having high dimensional accuracy cannot be obtained.

Accordingly, an object of the invention is to provide an integrated magnet body excellent in insulating property and effective volume ratio, and a high efficiency motor having the same installed therein.

DISCLOSURE OF THE INVENTION

As a result of various investigations made by the inventors in view of the foregoing standpoints, it has been found that a film having excellent insulating property only with a thin film is formed between one magnet piece and another magnet piece, and the film thickness of the insulating film and the ratio of the total sum of the thickness of the insulating films to the overall length in the laminating direction of the integrated magnet body are set at particular values, whereby an integrated magnet body excellent in insulating property and effective volume ratio can be obtained, and an efficiency of a motor can be improved by installing the integrated magnet body in the motor.

The invention has been made based on the foregoing findings, and the integrated magnet body of the invention is, as described in the claim 1, an integrated magnet body formed by laminating and securing a plurality of pieces of magnet through an insulating film between pieces of magnet, characterized in that the insulating film has a film thickness of 0.01 $\mu$m or more, and a ratio (l/L) of a total sum of the thickness of the insulating films (l) to an overall length in the laminating direction of the integrated magnet body (L) is in a range of from 0.0005 to 3%.

The integrated magnet body as described in the claim 2 is an integrated magnet body as described in the claim 1, characterized in that the film thickness of the insulating film is 50 $\mu$m or less.

The integrated magnet body as described in the claim 3 is an integrated magnet body as described in the claim 1 or 2, characterized in that the ratio (l/L) of the total sum of the thickness of the insulating films (l) to the overall length in the laminating direction of the integrated magnet body (L) is in a range of from 0.01 to 1%.

The integrated magnet body as described in the claim 4 is an integrated magnet body as described in one of the claims 1 to 3, characterized in that the insulating film is an inorganic insulating film containing, as a main component, at least one selected from a chromium oxide, a phosphorous oxide, a silicon oxide, an aluminum oxide, a titanium oxide and a zirconium oxide.

The integrated magnet body as described in the claim 5 is an integrated magnet body as described in one of the claims 1 to 3, characterized in that the insulating film is an organic insulating film containing a thermoplastic resin and/or a thermosetting resin.

The integrated magnet body as described in the claim 6 is an integrated magnet body as described in one of the claims 1 to 5, characterized in that the integrated magnet body is formed by securing by encompassing and integrating, with an organic resin, a laminated body obtained by laminating a plurality of pieces of magnet through an insulating film between the pieces of magnet.

The integrated magnet body as described in the claim 7 is an integrated magnet body as described in one of the claims 1 to 5, characterized in that the integrated magnet body is formed by securing by binding, with a high strength fiber strip, a laminated body obtained by laminating a plurality of pieces of magnet through an insulating film between the pieces of magnet.

The integrated magnet body as described in the claim 8 is an integrated magnet body as described in one of the claims 1 to 7, characterized in that the pieces of magnet are a rare earth metal-based permanent magnet.

The motor of the invention is, as described in the claim 9, characterized by comprising an integrated magnet body as described in one of the claims 1 to 8 installed therein.

BEST MODE FOR CARRYING OUT THE INVENTION

Figure 1:
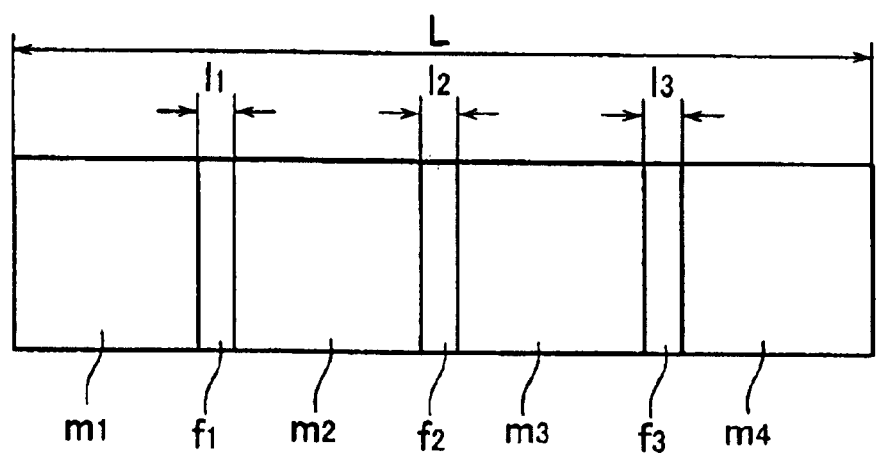
FIG. 1 is a reference view for calculating the ratio of the total sum of the thickness of the insulating films between the pieces of magnet to the overall length in the laminating direction of the integrated magnet body.
Figure 1:
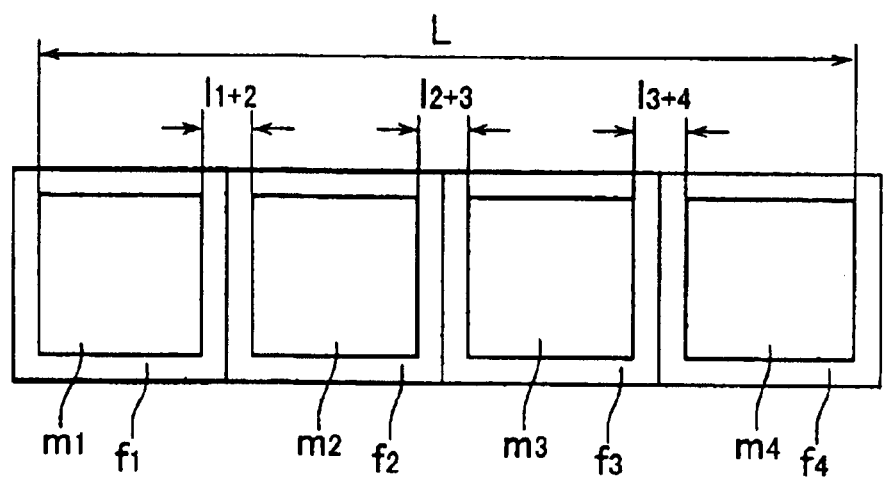

The integrated magnet body of the invention is an integrated magnet body formed by laminating and securing a plurality of pieces of magnet through an insulating film between pieces of magnet, characterized in that the insulating film has a film thickness of 0.01 µm or more, and a ratio (l/L) of a total sum of the thickness of the insulating films (l) to an overall length in the laminating direction of the integrated magnet body (L) is in a range of from 0.0005 to 3%.

The method for making the insulating film intervening the pieces of magnet may be such an embodiment that the insulating film is formed on one contact surface of the pieces of magnet in contact with each other, and the adjacent piece of magnet is laminated on the insulating film thus formed, or such an embodiment that the insulating films are formed on both contact surfaces of both the pieces of magnet, and the insulating films thus formed are made in contact with each other to accomplish lamination. It is not essential that the insulating film is formed only between the pieces of magnet, and therefore, the insulating film may be formed on other surfaces than the contact surfaces of the pieces of magnet depending on necessity in the foregoing embodiments. In particular, the later embodiment among the embodiments can generally be attained by forming the insulating films on the whole surfaces of the respective pieces of magnet.

Examples of the insulating film applied in the invention include an inorganic insulating film containing, as a main component, at least one selected from a chromium oxide, a phosphorous oxide, a silicon oxide, an aluminum oxide, a titanium oxide and a zirconium oxide. Because a treating liquid for forming the films has good wettability, the treating liquid quickly penetrates on the surface of the pieces of magnet, and therefore, such a film can be formed that is dense and excellent in adhesion and is excellent in insulating property only with a thin film.

Examples of the method for forming an insulating film containing a chromium oxide as a main component on the surface of the piece of magnet include such a method that a treating liquid containing at least one kind selected from chromic anhydride and a bichromate is coated on the surface of the piece of magnet, and then it is subjected to a heat treatment. Examples of the bichromate include sodium bichromate, potassium bichromate and the like.

The chromium oxide may be, for example, a composite chromium oxide of chromium and a divalent metal (such as Mg, Ca, Zr, Sr, Ba, Ni, Co, Zn, Mn, Sn, Pb, Cu, and the like). An insulating film containing the composite chromium oxide as a main component, particularly an insulating film containing the composite chromium oxide of chromium and Mg, Ca, Zr, Zn, Mn and the like, is such a film that is uniform and dense and is excellent in adhesion in comparison to the foregoing insulating films, and it is excellent in insulating property only with a thin film. The insulating film can be formed on the surface of the piece of magnet, for example, by using a treating liquid formed in such a manner that an oxide, a hydroxide, a carbonate or the like of a divalent metal is added to the treating liquid containing at least one kind selected from chromic anhydride and a bichromate, and furthermore, a polyhydric alcohol, such as ethylene glycol and the like, is added as a reducing agent suitably.

In order to improve the heat resistance and the corrosion resistance of the insulating film, boric acid, phosphoric acid and the like may be appropriately added to the treating liquid.

An insulating film containing an organic resin may be formed by using a treating liquid formed by adding an emulsion type organic resin or a water soluble organic resin to the aforementioned treating liquid. When the film is formed by using the treating liquid having an organic resin added thereto, improvement of the adhesion property of the film to the piece of magnet, prevention of cracking of the film upon forming the film, improvement of the heat resistance of the film, improvement of the adhesion property of the film to the adhesive, improvement of the wettability between the treating liquid and the surface of the piece of magnet, and the like can be attained. Examples of the organic resin include an acrylic resin, a urethane resin, a vinyl acetate resin, an epoxy resin and a copolymerization product of these organic resins. The organic resin may be those having been subjected to various kinds of modification treatments. The addition of a urethane-modified acrylic resin is effective for improvement of the heat resistance of the film. The addition of an acrylic-modified epoxy resin or a silica-modified acrylic resin is effective for improvement of the adhesion property of the film to the adhesive.

Examples of the method for forming an insulating film containing a phosphorous oxide as a main component on the surface of the piece of magnet include such a method that a treating liquid containing a hypophosphite, such as sodium hypophosphite and the like, and an oxidizing agent, such as sodium nitrate and the like, or a treating liquid containing a phosphate, such as iron phosphate, calcium phosphate, zinc phosphate and the like, is coated on the surface of the piece of magnet, and then it is subjected to a heat treatment. There are some cases where a hypophosphite and a phosphate are present in the insulating film.

Examples of the method for forming an insulating film containing a silicon oxide as a main component on the surface of the piece of magnet include such a method that a treating liquid containing a silicate, such as sodium silicate and the like, and a hydroxide is coated on the surface of the piece of magnet, and then it is subjected to a heat treatment. Further examples thereof include such a method that the film is formed by a coating and thermal decomposition method using a treating liquid containing a silicon compound, such as tetraethoxysilane and the like. Still further examples thereof include such a method that the film is formed by a sol-gel film forming method using a treating liquid obtained by a hydrolysis reaction, a polymerization reaction and the like of a silicon compound, and the like method.

Similarly, examples of the method for forming an insulating film containing an aluminum oxide as a main component on the surface of the piece of magnet include a method of forming by using a treating liquid containing an aluminate, such as potassium aluminate and the like, and a hydroxide, a method of forming by a coating and thermal decomposition method using a treating liquid containing an aluminum compound, such as aluminum acetylacetnate and the like, a method of forming by a sol-gel film forming method using a treating liquid obtained by a hydrolysis reaction, a polymerization reaction and the like of an aluminum compound, and the like method.

Similarly, examples of the method for forming an insulating film containing a titanium oxide as a main component on the surface of the piece of magnet include a method of forming by using a treating liquid containing a titanate, such as sodium titanate and the like, and a hydroxide, a method of forming by a coating and thermal decomposition method using a treating liquid containing a titanium compound, such as a titanium carboxylate and the like, a method of forming by a sol-gel film forming method using a treating liquid obtained by a hydrolysis reaction, a polymerization reaction and the like of a titanium compound, and the like method.

The insulating film may be those containing a composite metallic oxide containing both a silicon oxide and an aluminum oxide, as a main component. The film may be formed, for example, by using a treating liquid containing a silicon compound and an aluminum compound. An insulating film containing a zirconium oxide as a main component can be formed on the surface of the piece of magnet similarly to the insulating films containing a silicon oxide, an aluminum oxide or a titanium oxide as a main component.

Examples of the insulating film applied to the invention include an organic insulating film formed with a thermoplastic resin and/or a thermosetting resin, in addition to the foregoing inorganic insulating films. Examples of the method for forming the organic insulating film on the surface of the piece of magnet include such a method that a treating liquid containing the resin is coated on the surface of the piece of magnet, and then it is subjected to a heat treatment.

As the thermoplastic resin, a fluorine resin, saturated polyester, polyvinyl alcohol, polyvinyl acetal and the like can be used in addition to the acrylic resin, the urethane resin and the vinyl acetate resin described in the foregoing. These resins may be those having been subjected to various kinds of modification treatments, and maybe those having been emulsified. These resins may also be used solely or may be used after mixing an appropriate combination thereof.

As the thermosetting resin, a phenol resin, a melamine resin, unsaturated polyester, a silicone resin, polyurethane, an alkyd resin, a polyimide resin and the like can be used in addition to the epoxy resin described in the foregoing. These resins may be those having been subjected to various kinds of modification treatments, and maybe those having been emulsified. These resins may also be used solely or may be used after mixing an appropriate combination thereof.

Before forming the organic insulating film on the surface of the piece of magnet, various kinds of primer treatments may be carried out in order to improve the adhesion property between the piece of magnet and the film and to prevent deterioration of insulating property due to progress of corrosion of the piece of magnet. Examples of the primer treatment include an alkali treatment by coating an alkali solution of 0.01 to 0.1 N (such as an aqueous solution of lithium hydroxide, sodium hydroxide, potassium hydroxide, sodium carbonate or the like, aqueous ammonia and the like) on the surface of the piece of magnet, followed by heating, an alkali silicate treatment by coating a solution containing lithium silicate, sodium silicate and the like on the surface of the piece of magnet, followed by heating, as described in JP-A-9-7867 and the like, a molybdic acid treatment by coating a solution containing molybdic acid or a salt thereof on the surface of the piece of magnet, followed by heating, an oxidation treatment by heating the piece of magnet in an inert gas at 400 to 700° C., and the like method.

As a method for coating the treating liquid on the surface of the piece of magnet, for example, a dipping method, a dipping and spinning method, spray coating, and roller coating are employed. The surface of the piece of magnet before coating the treating liquid may be subjected to a pre-treatment, such as degreasing by using an organic solvent, washing with a weak acid by using an aqueous solution of phosphoric acid, acetic acid, oxalic acid, nitric acid or the like, for removing a surface modification layer, which maybe formed on the production process (such as a working step and a polishing step), and the like.

The thickness of the insulating film formed between the pieces of magnet is 0.01 $\mu$m or more. When the film thickness is less than 0.01 $\mu$m, there is a possibility that it influences the insulating property and the corrosion resistance of the film. When the thickness of the insulating film is too large, on the other hand, the effective volume ratio of the integrated magnet body is lowered corresponding to the thickness, so as to lower the effective magnetic flux density, whereby the motor efficiency is lowered. Therefore, the film thickness is preferably 50 $\mu$m or less, more preferably 20 $\mu$m or less, and further preferably 10 $\mu$m or less.

The ratio (l/L) of the total sum of the thickness of the insulating films intervening the pieces of magnet (l) to the overall length in the laminating direction of the integrated magnet body (L) is in a range of from 0.0005 to 3%. The calculation method for the ratio will be described with reference to FIG. 1.

In such an embodiment as shown in (a) that an insulating film is formed on one of the contact surfaces of the pieces of magnet in contact with each other, and then the adjacent piece of magnet is laminated on the insulating film thus formed, as the method for making the insulating film intervening the pieces of magnet (for example, as the relationship between the piece of magnet $m_1$ and the piece of magnet $m_2$ is explained, the insulating property between the piece of magnet $m_1$ and the piece of magnet $m_2$ is assured only with the insulating film $f_1$ formed on the contact surface of the piece of magnet $m_1$ in contact with the piece of magnet $m_2$. With respect to the relationship between the piece of magnet $m_3$ and the piece of magnet $m_4$, the insulating property between the piece of magnet $m_3$ and the piece of magnet $m_4$ is assured only with the insulating film $f_3$ formed on the contact surface of the piece of magnet $m_3$ in contact with the piece of magnet $m_4$, and no insulating film is formed on the piece of magnet $m_4$), the overall length in the laminating direction of the integrated magnet body is defined by L, and the total sum of the thickness of the insulating films intervening the pieces of magnet l is defined by $(l_1+l_2+l_3)$.

In such an embodiment as shown in (b) that an insulating films are formed on both contact surfaces of both the pieces of magnet, and lamination is carried out by contacting the respective insulating films thus formed, the overall length in the laminating direction of the integrated magnet body is defined by L, and the total sum of the thickness of the insulating films intervening the pieces of magnet l is defined by $(l_{1+2}+l_{2+3}+l_{3+4})$.

It is not essential that the insulating film is formed only between the pieces of magnet as described in the foregoing, it is possible that the film may be formed on the whole surface of the respective pieces of magnet as shown in (b) of FIG. 1. In this case, the thickness of the insulating films on both ends is not included in the overall length in the laminating direction of the integrated magnet body. Since the insulating film applied in the invention is a thin film, even when the film is formed on the whole surface of the pieces of magnet, it does not severely influence the effective volume ratio of the integrated magnet body. From the standpoint of assuring corrosion resistance of the pieces of magnet, it is preferred that the insulating film is formed on the whole surface of the pieces of magnet to a thickness of 0.005 μm or more.

In the case where an electroconductive film, such as an aluminum film, is formed on the surfaces of the respective pieces of magnet in order to impart corrosion resistance thereto, and then the insulating film of the invention is formed thereon, the calculation is carried out by assuming that the thickness of the electroconductive film is part of the length of the pieces of magnet.

In the case where the ratio (l/L) of the total sum of the thickness of the insulating films (l) to the overall length in the laminating direction of the integrated magnet body (L) is less than 0.0005%, there are some cases where the insulating property is insufficient to cause heat generation upon driving the motor, whereby the motor efficiency is lowered. When the ratio exceeds 3%, on the other hand, there are some cases where the effective volume ratio of the integrated magnet body is lowered to lower the effective magnetic flux density, whereby the motor efficiency is lowered. The ratio is preferably in a range of from 0.01 to 1% from a practical standpoint.

Figure 2:
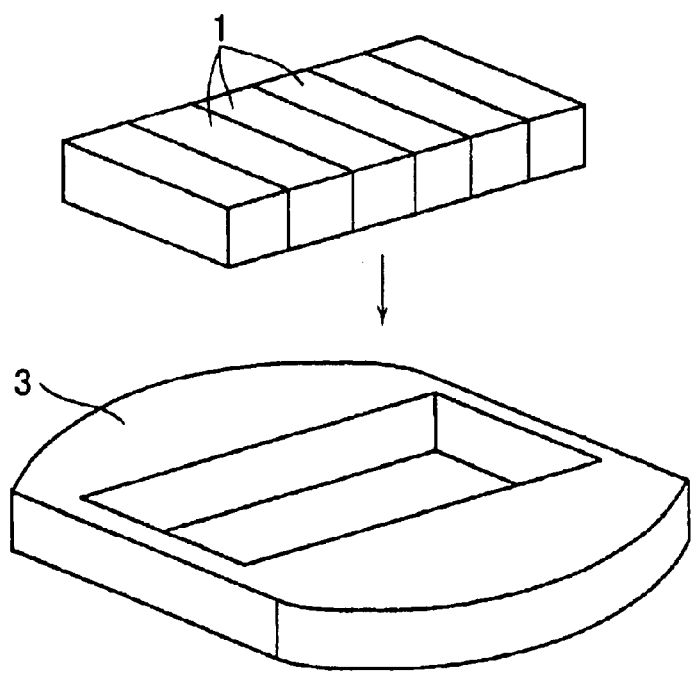
FIG. 2 is a perspective explanatory view showing an example of a securing method for obtaining an integrated magnet body according to the invention.

Examples of the method for laminating and securing a plurality of pieces of magnet to form an integrated magnet body include such a method that, as shown in FIG. 2, an outer frame 3 formed with an organic resin, such as unsaturated polyester, an epoxy resin and the like, is previously prepared, and a laminated body obtained by laminating a plurality of pieces of magnet 1 through an insulating film between the pieces of magnet is incorporated therein, followed by securing by encompassing and integrating through application of pressure and heat from the exterior, so as to make the integrated magnet body.

Figure 3:
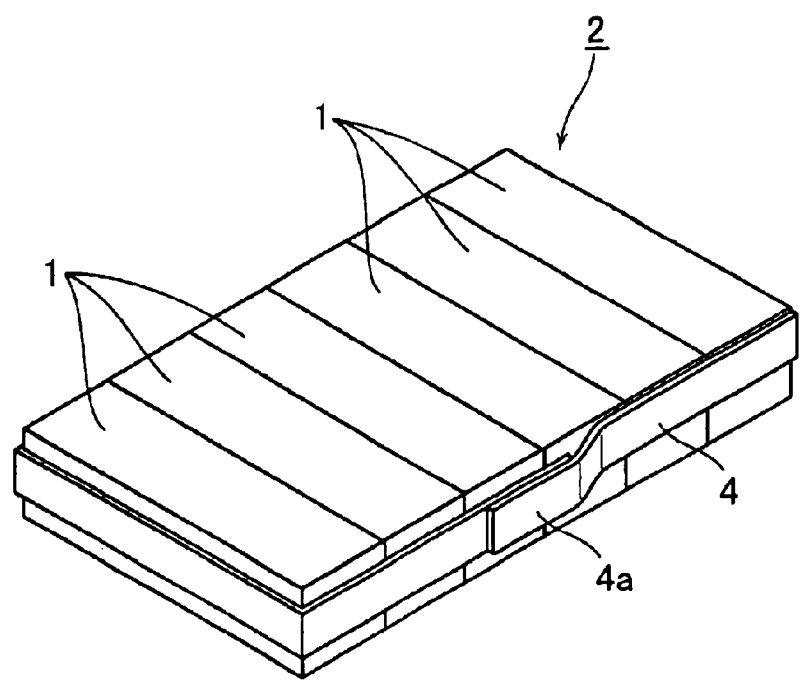
FIG. 3 is a perspective view showing an example of an integrated magnet body according to the invention.

Examples thereof also include such a method that a laminated body obtained by laminating a plurality of pieces of magnet through an insulating film between the pieces of magnet is secured by binding with a high strength fiber strip to make the integrated magnet body. Examples of the high strength fiber strip include aramid fibers (aromatic polyamide fibers). Examples of the specific method for binding with a high strength fiber strip include such a method that, as shown in FIG. 3, a woven fabric in a tape form of aramid fibers 4, in which overlapping parts at the ends thereof have been impregnated with an epoxy resin or the like to form joint parts 4a, is wound on the laminated body, and then the joint parts 4a are thermally fused to obtain the integrated magnet body 2. In the integrated magnet body shown in FIG. 3, because magnetic poles are formed on the principal surfaces (the upper and lower surfaces in the figure) of the laminated body, it is not effective that the high strength fiber strip is arranged on the principal surfaces from the standpoint of magnetic efficiency. Therefore, the high strength fiber strip is arranged on the side surfaces of the laminated body.

Furthermore, it is also possible that the whole laminated body is secured by coating the whole surface thereof with a thermosetting resin or the like using the known injection molding technique to form the integrated magnet body.

Various kinds of organic resins can be selected to obtain the organic insulating film as described in the foregoing, and a thermoplastic resin such as an acrylic resin, a mixed resin of that resin and a thermosetting resin such as an epoxy resin, and a resin formed by subjecting these resins to a modification treatment have thermal fusing property. Therefore, for example, the integrated magnet body can be efficiently obtained in such a manner that an insulating film is formed on the whole surface of the pieces of magnet by using the resin, and the pieces of magnet are then laminated through the insulating films, followed by thermal fusing the insulating films under a light pressure with heating the laminated body to a prescribed temperature.

Examples of the pieces of magnet applied in the invention include a known rare earth metal-based permanent magnet, such as an R—Co based permanent magnet, an R—Fe—B based permanent magnet, an R—Fe—N based permanent magnet and the like. Among these, an R—Fe—B based permanent magnet is preferred from the standpoint of high magnetic characteristics, excellent mass-productivity and economy, and the like. The rare earth element (R) in the rare earth metal-based permanent magnet preferably contains at least one kind of Nd, Pr, Dy, Ho, Tb and Sm, or further contains at least one kind of La, Ce, Gd, Er, Eu, Tm, Yb, Lu and Y.

While only one kind of R is generally sufficient, a mixture of two or more kinds thereof (misch metal, didymium and the like) may be practically used due to reasons of convenience in availability.

Furthermore, improvement of the coercive force and the rectangularity of a demagnetizing curve, improvement of the productivity, and low cost can be attained by adding at least one kind of Al, Ti, V, Cr, Mn, Bi, Nb, Ta, Mo, W, Sb, Ge, Sn, Zr, Ni, Si, Zn, Hf and Ga.

Figure 4:
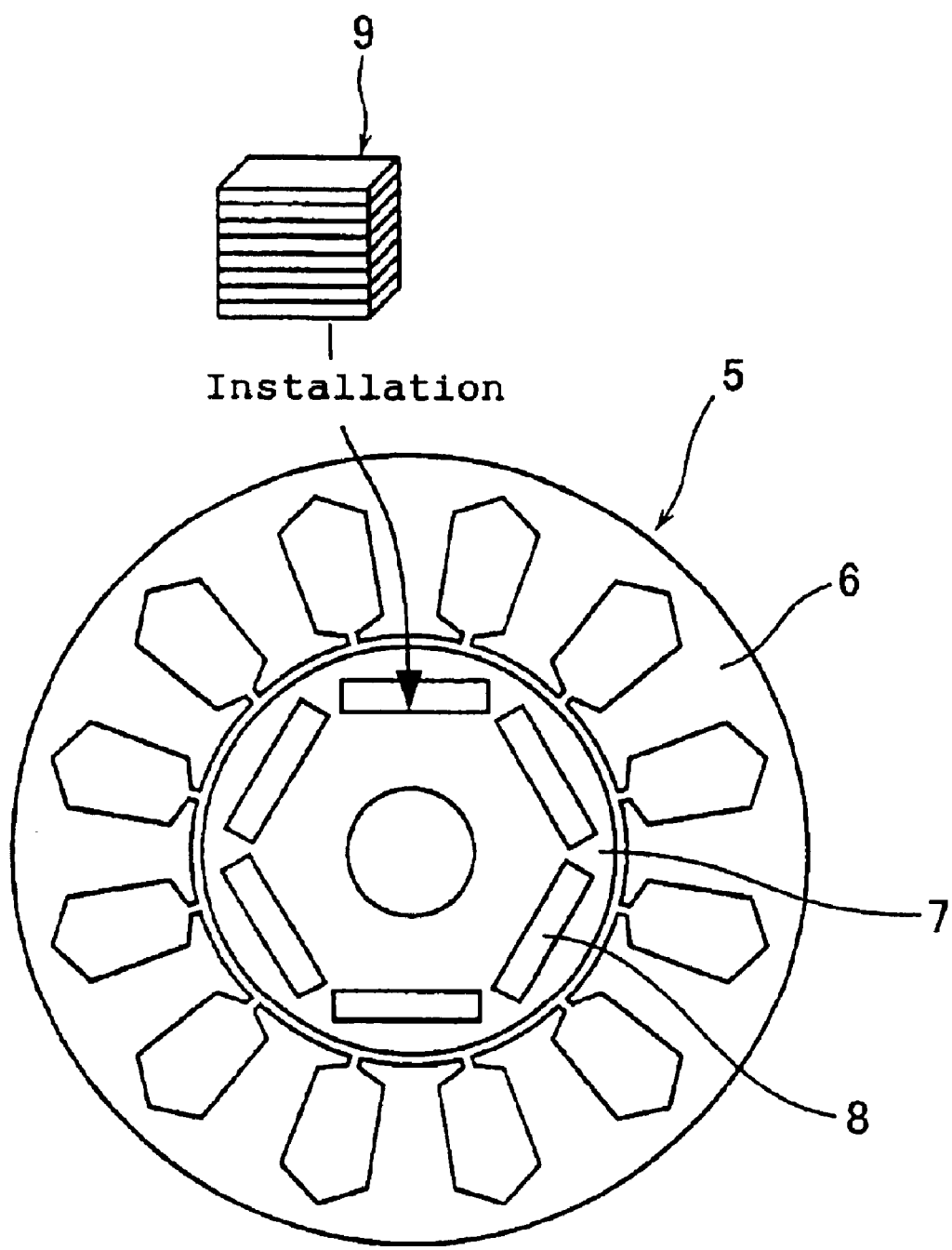
FIG. 4 is an explanatory view showing a constitutional example of an IPM.

The integrated magnet body of the invention obtained in the foregoing manner is, for example, installed in an IPM by the method shown in FIG. 4. That is, the IPM 5 is constituted with a core 6 and a rotor 7 arranged thereinside, and the integrated magnet bodies 9 of the invention are embedded as rotor magnets 8 in six sites in the rotor 7. The motor thus obtained is a motor having high efficiency owing to the integrated magnet body excellent in insulating property and effective volume ratio.

EXAMPLE

The invention will be described in more detail with reference to examples. While the following examples use sintered magnets, the invention can also be applied to a bond magnet as well as the sintered magnet.

Example A (Examples 1 to 5)

The following experiment was carried out by using an Nd—Fe—B based permanent magnet (sintered magnet) having a composition of 26 wt % of Nd, 72 wt % of Fe, 1 wt % of B and 1 wt % of Co having a dimension of 10 mm in length, 50 mm in width and 5 mm in height as pieces of magnet.

The pieces of magnet were degreased with an organic solvent and then washed with a weak acid using a 5 wt % phosphoric acid aqueous solution. A treating liquid stock solution was prepared, which contained 350 g/l of chromic acid, 70 g/l of magnesium hydroxide, 50 g/l (in terms of resin content) of an acrylic resin emulsion (Polytlon F2000, produced by Asahi Kasei Corp.), 5 g/l of ethylene glycol as a reducing agent and 20 g/l of boric acid. Treating liquids having various concentrations were prepared by diluting the treating liquid stock solution with water, and the treating liquid was coated on the whole surfaces of the respective pieces of magnet by the dipping method and subjected to a heat treatment at 280° C. for 20 minutes, whereby insulating films containing a composite chromium oxide of chromium and magnesium as a main component having various values of thickness were formed on the whole surfaces of the pieces of magnet. The results of the measurement of thickness are shown in Table 1. The pieces of magnet were allowed to stand under high temperature and high humidity conditions of a temperature of 80° C. and a relative humidity of 90% for 300 hours to carry out a corrosion resistance test. The results are shown in Table 1.

Eight pieces of the pieces of magnet having the insulating film on the whole surface thereof were laminated in the height direction in an outer frame having been produced by molding unsaturated polyester, and were secured through encompassing and integrating by applying pressure and heat from the exterior, whereby an integrated magnet body was obtained (see FIG. 2). The integrated magnet body was installed in an IPM (four-pole, 15 kW, pulse width modulation type), and the motor efficiency (output electric power/input electric power) was evaluated at a rotation number of 5,400 rpm. The results are shown in Table 1.

Comparative Example 1

The pieces of magnet described in Example A were used, and an insulating film containing a composite chromium oxide of chromium and magnesium as a main component having a thickness of 0.004 μm was formed on the whole surfaces of the pieces of magnet in the same manner as in Example A. The pieces of magnet having the insulating film on the whole surface thereof were subjected to the corrosion resistance test described in Example A. The result is shown in Table 1. An integrated magnet body was produced by using the pieces of magnet having the insulating film on the whole surface thereof in the same manner as in Example A, and the motor efficiency was evaluated. The result is shown in Table 1.

Comparative Example 2

Pieces of magnet that were the same as the pieces of magnet used in Example A except that the height was 4.85 mm to obtain the overall length (L) of the integrated magnet body that is substantially the same as in Example A was used, and an insulating film containing a composite chromium oxide of chromium and magnesium as a main component having a thickness of 100 μm was formed on the whole surfaces of the pieces of magnet in the same manner as in Example A. The pieces of magnet having the insulating film on the whole surface thereof were subjected to the corrosion resistance test described in Example A. The result is shown in Table 1. An integrated magnet body was produced by using the pieces of magnet having the insulating film on the whole surface thereof in the same manner as in Example A, and the motor efficiency was evaluated. The result is shown in Table 1.

TABLE 1

| | Thickness of insulating film formed on respective pieces of magnet (μm) | Result of corrosion resistance test | l/L (%) | Motor efficiency (%) |
|---|---|---|---|---|
| Comparative Example 1 | 0.004 | partially rust formed | 0.00014 | 82 |
| Example 1 | 0.05 | no rust formed | 0.0018 | 93 |
| Example 2 | 0.5 | no rust formed | 0.018 | 92 |
| Example 3 | 2.5 | no rust formed | 0.088 | 90 |
| Example 4 | 5 | no rust formed | 0.18 | 89 |
| Example 5 | 10 | no rust formed | 0.35 | 89 |
| Comparative Example 2 | 100 | no rust formed | 3.5 | 85 |

As apparent from Table 1, the integrated magnet bodies of Example A (Examples 1 to 5) exhibited excellent insulating property, the respective pieces of magnet thereof exhibited excellent corrosion resistance, and the IPM having them installed therein exhibited a motor efficiency of about 90% or more. The integrated magnet body of Comparative Example 1 had the insulating film that did not have a thickness exerting sufficient insulating property, and therefore, the IPM having the same installed therein exhibited a poor motor efficiency. The respective pieces of magnet thereof exhibited poor corrosion resistance. The integrated magnet body of Comparative Example 2 had the insulating film having a large thickness to lower the effective volume ratio of the integrated magnet body corresponding to the extent of the thickness, and therefore, the IPM having the same installed therein exhibited a poor motor efficiency.

Example B (Examples 6 to 11)

The following experiment was carried out by using the same pieces of magnet as the pieces of magnet described in Example A. An insulating film having a thickness of 5 μm was formed on the whole surface of the pieces of magnet by using the treating liquids shown in Table 2 in the same manner as in Example A. The pieces of magnet having the insulating film on the whole surface thereof were subjected to the corrosion resistance test described in Example A. The results are shown in Table 3.

A laminated body obtained by laminating eight pieces of the pieces of magnet having the insulating film on the whole surface thereof in the height direction was secured by binding with a high strength fiber strip formed with aramid fibers as shown in FIG. 3 to obtain an integrated magnet body (l/L: 0.18%). The integrated magnet body was evaluated for motor efficiency under the same conditions as in Example A. The results are shown in Table 3.

TABLE 2

| | Treating liquid components | Main component of insulating film |
|---|---|---|
| Example 6 | sodium hypophosphite, sodium nitrate (oxidizing agent) | phosphorous oxide |
| Example 7 | tetraethoxysilane (15 wt % in terms of $SiO_2$), ethanol, hydrochloric acid, ammonia | silicon oxide |
| Example 8 | potassium aluminate, zirconium hydroxide | aluminum oxide |
| Example 9 | aluminum acetylacetnate (10 wt % in terms of $Al_2O_3$), isopropyl alcohol, acetic acid | aluminum oxide |
| Example 10 | sodium titanate, calcium hydroxide | titanium oxide |
| Example 11 | titanium carboxylate (15 wt % in terms of $TiO_2$), aminoalcohol, ammonia | titanium oxide |

TABLE 3

| | Result of corrosion resistance test | Motor efficiency (%) |
|---|---|---|
| Example 6 | no rust formed | 91 |
| Example 7 | no rust formed | 90 |
| Example 8 | no rust formed | 91 |
| Example 9 | no rust formed | 92 |
| Example 10 | no rust formed | 90 |
| Example 11 | no rust formed | 92 |

As apparent from Table 3, the integrated magnet bodies of Example B (Examples 6 to 11) exhibited excellent insulating property, the respective pieces of magnet thereof exhibited excellent corrosion resistance, and the IPM having them installed therein exhibited a high motor efficiency of 90% or more.

Example C (Examples 12 and 13)

The following experiment was carried out by using an Nd—Fe—B based permanent magnet (sintered magnet) having a composition of 23 wt % of Nd, 75 wt % of Fe, 1 wt % of B and 1 wt % of Co having a dimension of 10 mm in length, 50 mm in width and 5 mm in height as pieces of magnet.

The pieces of magnet were degreased with an organic solvent and then washed with a weak acid using a 5 wt % phosphoric acid aqueous solution. A treating liquid stock solution was prepared by mixing an acrylic resin emulsion (Polytlon F2000, produced by Asahi Kasei Corp.), an epoxy resin (YUKA-RESINE-201, produced by Yoshimura Oil Chemical Co., Ltd.) and an amine based epoxy resin curing agent (YUKA-RESIN H-35, produced by Yoshimura Oil Chemical Co., Ltd.) as resin components in a weight ratio of 50/42/8. Treating liquids having two kinds of concentrations were prepared by diluting the treating liquid stock solution with water, and the treating liquid was coated on the whole surfaces of the respective pieces of magnet by the dipping method and subjected to a heat treatment at 120° C. for 10 minutes, whereby organic insulating films having a thickness of 2.5 $\mu$m or 6 $\mu$m were formed on the whole surfaces of the pieces of magnet. The pieces of magnet having the insulating film on the whole surface thereof were subjected to the corrosion resistance test described in Example A. The results are shown in Table 4.

Eight pieces of the pieces of magnet having the insulating film on the whole surface thereof were laminated in the height direction, and the resulting laminated body was secured by thermal fusing the insulating films under heating to 250° C. with light pressure to obtain an integrated magnet body. The integrated magnet body was installed in an IPM (eight-pole, 10 kW, pulse width modulation type), and the motor efficiency (output electric power/input electric power) was evaluated at a rotation number of 7,000 rpm. The results are shown in Table 4.

Comparative Example 3

Pieces of magnet that were the same as the pieces of magnet used in Example C except that the height was 4.85 mm to obtain the overall length (L) of the integrated magnet body that is substantially the same as in Example C was used, and an organic insulating film having a thickness of 100 $\mu$m was formed on the whole surfaces of the pieces of magnet in the same manner as in Example C. The pieces of magnet having the insulating film on the whole surface thereof were subjected to the corrosion resistance test described in Example A. The result is shown in Table 4. An integrated magnet body was produced by using the pieces of magnet having the insulating film on the whole surface thereof in the same manner as in Example C, and the motor efficiency was evaluated. The result is shown in Table 4.

TABLE 4

| | Thickness of insulating film formed on respective pieces of magnet ($\mu$m) | Result of corrosion resistance test | l/L (%) | Motor efficiency (%) |
|---|---|---|---|---|
| Example 12 | 2.5 | no rust formed | 0.088 | 91 |
| Example 13 | 6 | no rust formed | 0.21 | 88 |
| Comparative Example 3 | 100 | no rust formed | 3.5 | 82 |

As apparent from Table 4, the integrated magnet bodies of Example C (Examples 12 and 13) exhibited excellent insulating property, the respective pieces of magnet thereof exhibited excellent corrosion resistance, and the IPM having them installed therein exhibited a motor efficiency of about 90%. The integrated magnet body of Comparative Example 3 had the insulating film having a large thickness to lower the effective volume ratio of the integrated magnet body corresponding to the extent of the thickness, and therefore, the IPM having the same installed therein exhibited a poor motor efficiency.

Example D (Examples 14 to 15)

The following experiment was carried out by using the same pieces of magnet as the pieces of magnet described in Example C. A treating liquid stock solution was prepared by mixing an acrylic-modified epoxy resin (YUKA-RESIN KE-516, produced by Yoshimura Oil Chemical Co., Ltd.) and an amine based epoxy resin curing agent (YUKA-RESINH-35, produced by Yoshimura Oil Chemical Co., Ltd.) as resin components in a weight ratio of 90/10. Treating liquids having two kinds of concentrations were prepared by diluting the treating liquid stock solution with water, and the treating liquid was coated on the whole surfaces of the respective pieces of magnet by the dipping method and subjected to a heat treatment at 150° C. for 10 minutes, whereby organic insulating films having a thickness of 1 $\mu$m or 6 $\mu$m were formed on the whole surfaces of the pieces of magnet. The pieces of magnet having the insulating film on the whole surface thereof were subjected to the corrosion resistance test described in Example A. The results are shown in Table 5. An integrated magnet body was produced by using the pieces of magnet having the insulating film on the whole surface thereof in the same manner as in Example C, and the motor efficiency was evaluated. The results are shown in Table 5.

TABLE 5

| | Thickness of insulating film formed on respective pieces of magnet ($\mu$m) | Result of corrosion resistance test | l/L (%) | Motor efficiency (%) |
|---|---|---|---|---|
| Example 14 | 1 | no rust formed | 0.035 | 93 |
| Example 15 | 6 | no rust formed | 0.21 | 91 |

As apparent from Table 5, the integrated magnet bodies of Example D (Examples 14 and 15) exhibited excellent insulating property, the respective pieces of magnet thereof exhibited excellent corrosion resistance, and the IPM having them installed therein exhibited a motor efficiency of 90% or more.

Example E (Examples 16 to 18)

An Nd—Fe—B based permanent magnet (sintered magnet) having a composition of 26 wt % of Nd, 72 wt % of Fe, 1 wt % of B and 1 wt % of Co having a dimension of 10 mm in length, 30 mm in width and 3 mm in height was used as pieces of magnet and was subjected to the following experiment after being degreased with an organic solvent and then washed with a weak acid using a 5 wt % nitric acid aqueous solution.

The following experiment was carried out for Example 16. The pieces of magnet having been washed with a weak acid were dipped in a 0.1 N sodium hydroxide aqueous solution at 50° C. for 20 seconds as a primer treatment, and after flashing the solution by air blowing, it was subjected to a heat treatment at 120° C. for 10 minutes. The whole surface of the pieces of magnet having been subjected to the primer treatment was coated with a treating liquid prepared by mixing an aqueous urethane resin emulsion (UCOAT UWS-145, produced by Sanyo Chemical Industries, Ltd.) and a melamine crosslinking agent (Cymel 325, produced by Mitsui Cytec, Ltd.) as resin components in a weight ratio of 85/15 and diluting with water by the dipping method, and it was subjected to a heat treatment at 150° C. for 20 minutes to form an organic insulating film having a thickness of 7 $\mu$m on the whole surface of the pieces of magnet. The pieces of magnet having the insulating film on the whole surface thereof were subjected to the corrosion resistance test described in Example A, and no formation of rust was observed. An integrated magnet body (l/L: 0.41%) was produced by using the pieces of magnet having the insulating film on the whole surface thereof in the same manner as in Example A and evaluated for motor efficiency, and an IPM having the integrated magnet body installed therein exhibited a motor efficiency of 90%.

The following experiment was carried out for Example 17. The pieces of magnet having been washed with a weak acid were dipped in a treating liquid containing 0.1 mol/L of sodium molybdate, 0.18 mol/L of phosphoric acid and 0.1 mol/L of sodium nitrate for 15 minutes as a primer treatment, and after washing with water, it was subjected to a heat treatment at 150° C. for 5 minutes. The whole surface of the pieces of magnet having been subjected to the primer treatment was spray-coated with a treating liquid containing 55% by weight (in terms of resin content) of an aqueous urethane-modified epoxy resin (YUKA-RESIN KE-163, produced by Yoshimura Oil Chemical Co., Ltd.), and it was subjected to a heat treatment at 180° C. for 20 minutes to form an organic insulating film having a thickness of 15 $\mu$m on the whole surface of the pieces of magnet. The pieces of magnet having the insulating film on the whole surface thereof were subjected to the corrosion resistance test described in Example A, and no formation of rust was observed. An integrated magnet body (l/L: 0.87%) was produced by using the pieces of magnet having the insulating film on the whole surface thereof in the same manner as in Example A and evaluated for motor efficiency, and an IPM having the integrated magnet body installed therein exhibited a motor efficiency of 88%.

The following experiment was carried out for Example 18. The pieces of magnet having been washed with a weak acid were subjected to a heat treatment in an argon gas at 600° C. for 1 hour as a primer treatment. The whole surface of the pieces of magnet having been subjected to the primer treatment was spray-coated with a solvent based phenol-modified epoxy resin (FASTITE No. 180, produced by Ohashi Chemical Industries, Ltd.), and it was subjected to a heat treatment at 180° C. for 20 minutes to form an organic insulating film having a thickness of 20 $\mu$m on the whole surface of the pieces of magnet. The pieces of magnet having the insulating film on the whole surface thereof were subjected to the corrosion resistance test described in Example A, and no formation of rust was observed. An integrated magnet body (l/L: 1.2%) was produced by using the pieces of magnet having the insulating film on the whole surface thereof in the same manner as in Example A and evaluated for motor efficiency, and an IPM having the integrated magnet body installed therein exhibited a motor efficiency of 87%.

Industrial Applicability

As described in the foregoing, because the integrated magnet body according to the invention has a film having excellent insulating property only with a thin film between pieces of magnet, the eddy current loss and the heat generation of the magnet can be effectively suppressed, and the effective volume ratio of the magnet can be improved, whereby improvement of the motor characteristics can be attained, which brings about improvement of the efficiency of the motor. Furthermore, the dimensional accuracy of the integrated magnet body can also be improved, whereby miniaturization and high performance of the motor can be attained along with improvement of the motor efficiency.

What is claimed is:

1. An integrated magnet body formed by laminating and securing a plurality of pieces of magnet through an insulating film between pieces of magnet, characterized in that the insulating film has a film thickness of 0.01 $\mu$m or more, and a ratio (l/L) of a total sum of the thickness of the insulating films (l) to an overall length in the laminating direction of the integrated magnet body (L) is in a range of from 0.0005 to 3%.

2. An integrated magnet body as claimed in the claim 1, characterized in that the film thickness of the insulating film is 50 $\mu$m or less.

3. An integrated magnet body as claimed in claim 1, characterized in that the ratio (l/L) of the total sum of the thickness of the insulating films (l) to the overall length in the laminating direction of the integrated magnet body (L) is in a range of from 0.01 to 1%.

4. An integrated magnet body as claimed in claim 1, characterized in that the insulating film is an inorganic insulating film containing, as a main component, at least one selected from a chromium oxide, a phosphorous oxide, a silicon oxide, an aluminum oxide, a titanium oxide and a zirconium oxide.

5. An integrated magnet body as claimed in claim 1, characterized in that the insulating film is an organic insulating film containing a thermoplastic resin and/or a thermosetting resin.

6. An integrated magnet body as claimed in claim 1, characterized in that the integrated magnet body is formed by scouring by encompassing and integrating, with an organic resin, a laminated body obtained by laminating a plurality of pieces of magnet through an insulating film between the pieces of magnet.

7. n integrated magnet body as claimed in claim 1, characterized in that the integrated magnet body is formed by securing by binding, with a high strength fiber strip, a laminated body obtained by laminating a plurality of pieces of magnet through an insulating film between the pieces of magnet.

8. An integrated magnet body as claimed in claim 1 , characterized in that the pieces of magnet are a rare earth metal-based permanent magnet.

9. A motor characterized by comprising an integrated magnet body as claimed in claim 1 installed therein.

* * * * *